Feb. 13, 1962 — R. L. SIERING — 3,020,602
WALLBOARD FASTENER
Filed Nov. 7, 1957
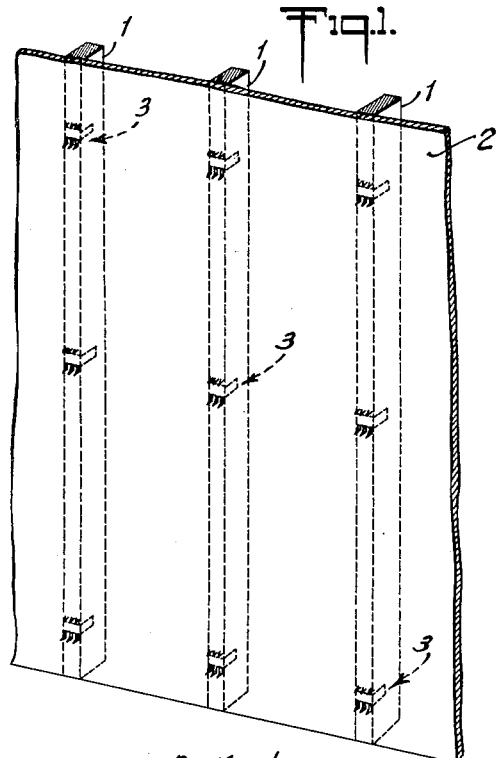
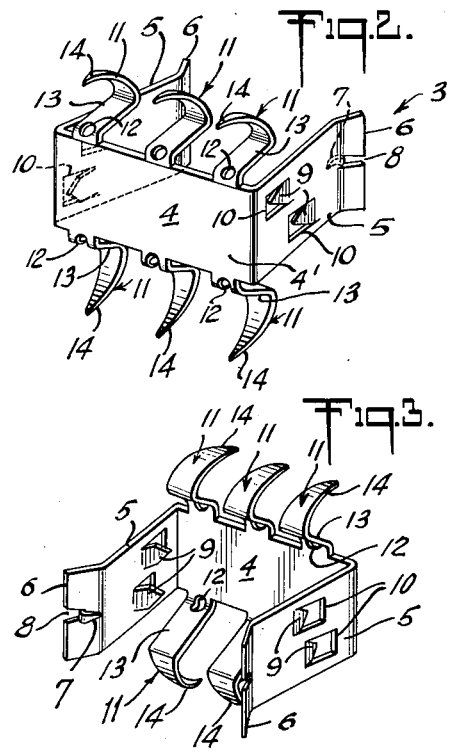
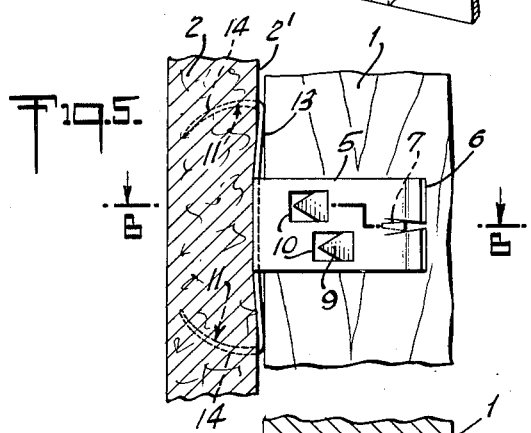
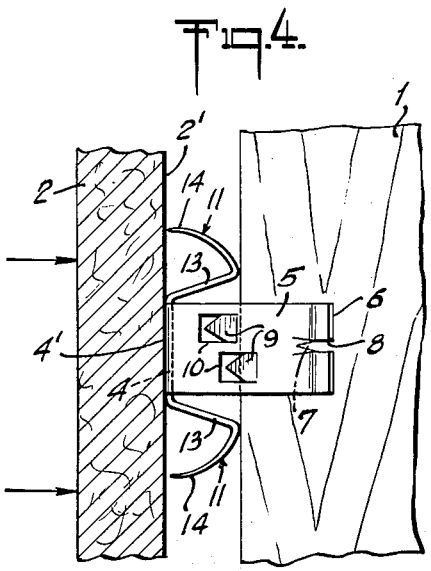
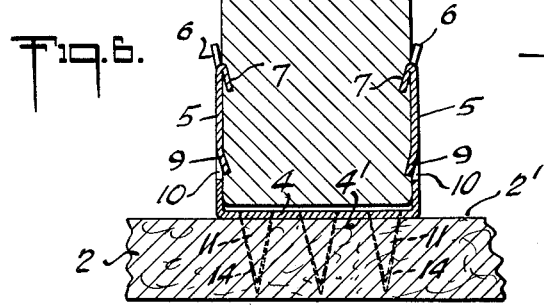
INVENTOR
ROBERT L. SIERING
BY
John A. McKinney
ATTORNEY United States Patent Office 3,020,602
Patented Feb. 13, 1962

3,020,602
WALLBOARD FASTENER
Robert L. Siering, Sea Cliff, N.Y., assignor to Johns-Manville Corporation, New York, N.Y., a corporation of New York
Filed Nov. 7, 1957, Ser. No. 695,060
10 Claims. (Cl. 20—4)

This invention relates to wallboard fasteners and more specifically to the types of fasteners known as "hidden" or "blind" fasteners for securing conventional wallboard to studding, beams and the like.

It is conventional building construction practice to utilize fasteners of the hidden type, i.e., where the fastener is situated between two elements to be secured together, as for example, between a wallboard and any form of studding. In this form of construction, means are provided on each fastener to secure itself to such studding and some form of prong means are additionally provided on the fastener for securing the wallboard to the fastener. A disadvantage of prior art constructions is the fact that either the prongs on the fasteners enter and remain in the wallboard at approximate right-angles resulting in a very low prong holding action or the fasteners usually engage or lock the wallboard to themselves by the action of the wallboard upon the fasteners, resulting in bent prongs or disruptions in the fibrous or other interior structure of the wallboard, so that the prongs are not fully or securely engaged with the wallboard, or are subject to dislodgement therefrom with the disrupted portions of the wallboard, thus providing insufficient holding power. Additionally, prior art devices have added securing means to mount the fastener to the studding of a type which have the disadvantage of requiring manual manipulation prior to the final mounting of the wallboard.

It is an object of this invention therefore to provide a wallboard fastener which automatically secures itself, with improved holding power, to studding, and the like, upon mating of the wallboard with the studding after initial or temporary securement of the fastener to the studding.

It is a further object of this invention to provide a wallboard fastener which locks itself to the wallboard by the reaction of the studding upon the fastener.

It is an additional object of this invention to provide a wallboard fastener which has increased holding power and provides this increased holding power with less disruption in the interior structure of such board than that which occurs with the use of conventional fasteners having less holding power.

It is still another object of this invention to provide a curved fastener which has prongs thereon which enter the wallboard at approximate right angles to obtain thereby a sharp impaling action, and, when fully engaged with the wallboard, are arced sharply within the board to obtain a strong holding action.

In brief, the present invention resides in a novel hidden fastener which depends upon reaction of the studding upon the fastener to lock such fastener to a wallboard, resulting in an increased and clean penetration by the fastener into the board with a minimum of disruption of the interior of the board, and which automatically secures itself to the studding during this locking action between the fastener and the wallboard and after initial temporary placement of the fastener on the studding.

The invention will be more fully understood and further objects and advantages thereof will become apparent when reference is made to the following detailed description of a preferred embodiment of the invention and the accompanying drawings in which:

FIG. 1 is a perspective view of an assembled wall structure;

FIGS. 2 and 3 are front and rear perspective views respectively of the fastener utilized in the construction of FIG. 1;

FIG. 4 is a view principally in side elevation, but partly in section, of the fastener, wall-board and studding prior to full engagement; and FIG. 5 is a view principally in side elevation, but partly in section, of the construction of the invention, with the fastener in its fully locked position; and FIG. 6 is a cross-sectional view taken on the line 6—6 of FIG. 5.

Referring to FIG. 1, a conventional wall unit is shown comprising studding, beams or furring strips 1, hereinafter referred to merely as studding, having secured thereto any form of conventional wallboard 2 by means of hidden fasteners 3 located between such wallboard and studding. With such a construction, the wallboard is mounted without having any visible form of support in the form of exposed brackets, nailheads, etc.

Each such fastener 3 (FIGS. 2 and 3) is fabricated from sheet metal or like materials and comprises a rectangular base 4, from which project a pair of legs or arms 5 to form thereby a U shape, with the bight of the U shaped fastener intended to be filled by the adjacent studding. Legs 5 are bent inwardly towards each other adjacent their extremities 6 to provide a spring-like effect, with the distance between the leg extremities being slightly less than the thickness of the studding on which the fastener is to be used. Each extremity 6 is also curved outwardly to prevent snagging of the fastener and to lead it into position when it is slid over the studding. Projecting from the opposite free edges of the rectangular base 4 are a plurality of prongs or hooks 11; each prong is fairly narrow in width, as compared to its mounting base 4, and preferably has a drilled, or otherwise formed hole 12 therein at the approximate juncture of the prong and base 4 to provide for flexibility of movement for such prong thereabout as a sort of hinge point. Each prong further comprises a straight portion or arm 13 which extends rearwardly in the direction of legs 5 and a reversed, continuously curved portion 14, contiguous with the arm 13; the resultant bight, formed between portions 13, 14 of each prong, faces in the same direction as the forward face 4' of base 4. Likewise, since the prong is curved in part, a plane is determined by the longitudinal center line of each prong, and such plane is approximately parallel to the pairs of planes containing the legs 5. Arc portion 14 approximates an arc of a circle whose radius is equal to the length of arm 13 and whose center is at the juncture of the prong with base 4, and the free end of the arc tapers to a relatively fine point to provide for easier penetration of the wallboard.

Each leg 5 has a plurality of anchor points which extend toward the opposite leg. Thus, a pair of slots 10 are formed in each leg 5 with flexible anchor 9 extending rearwardly from a front wall of each slot and also extending inwardly toward the opposite leg. An additional anchor is provided at the terminal edge 6 by cutting a slit 8 and turning inwardly toward the opposite leg that portion 7 which previously was situated in the slit.

Referring to FIG. 4, each prong 11 is seen to be rearwardly extended for about one-half the length of each leg 5. The curved extension 14 is arced in such a manner that a tangent to any point on the extension 14 is approximately perpendicular to the plane of forward surface 4' of base 4, when such point passes this imaginary plane, as when the prong 11 is rotated about the juncture of its portion 13 with base 4 as referred to above.

In assembling the wall construction of FIG. 1, the fastener is first temporarily secured to the studding 1 (FIG. 4) with the base 4 spaced a considerable distance from the studding; in view of the spring-like effect of legs 5, the fastener may be left in this temporarily secured position without danger of its falling. When the legs thus partially straddle the studding, each prong 11 has its convex portion abutting the adjacent studding 1. After a plurality of such fasteners are similarly temporarily secured in place on predetermined points on the studding, the wallboard 2 is raised and properly aligned with the other sections of wallboard forming a continuous wall and it is smartly pounded adjacent each fastener, usually by hammering a block of wood placed on the board in line with a fastener to prevent marring or indenting of the wallboard surface. With such pounding, the arcuate portion 14 of each prong 11, pivoting about the juncture of base 4 with prong 11, impales the wallboard as a result of the reaction of the studding 1 upon the convex or rearward section of the prong. At the point of entry, the rearward planar surface 2' of the wallboard 2 and a tangent to any small segment of the arc 14 entering the wallboard are approximately perpendicular to each other. Since the pivot point of the prong remains fixed relative to the wallboard and the point of entry into the board by the prong remains the same for all points or small segments on the arc 14, a sharp or clean entry is thereby provided and disruptions of the structural interior are kept to a minimum. Simultaneously with this wall entry, the legs 5 cover a greater and greater surface area of the studding 1 and the frictional bight of the U base on the studding is steadily increased; the latter structure forces the legs farther apart and the spring effect of the legs is utilized to mate the fastener securely to the stud. The fastener is further anchored to the studding by the inwardly projecting anchor points 9 and 7 embedding themselves in the relatively soft wood.

When the wallboard is finally mated to the studding, each fastener has its base 4 abutting or substantially abutting an adjacent studding 1 (FIGS. 5 and 6) and each prong arm 13 is approximately parallel with such base. The arcuate portions 14 of every prong have cleanly impaled the wallboard with a minimum of disruption of it internally and are firmly embedded therein, being arced within the wallboard towards each other, and embracing a relatively large mass of substantially undisrupted material of the board, and being in large surface contact therewith. The legs 5, on the other hand abut, or substantially abut the studding 1 along their entire inner face and the anchor points 7, 9 are at least slightly embedded in such studding.

If an external shock or pull occurs, the wallboard is not easily separated from the studding, as a tear-out of a relatively large mass of substantially undisrupted and hence strongly held material must usually occur in order for the separation to take place. If the wallboard is for example, wood fiberboard of the lower densities, this problem of tear-out of material may be particularly aggravated. It is therefore significant that, in the instant construction, sufficient material is situated between arc 14 and portion 13 of each prong and between arcs 14 of oppositely facing prongs to require a fairly large shearing force, produced by such shock or pull, before this tear-out can occur. On the other hand, if the wallboard is of the stronger, denser boards, as for example, plywood or gypsum board, the penetration of each prong is as deep and complete as in the softer wallboards due to the manner in which the prongs are forced into the board, i.e., by the reaction of the studding 1 upon the rearward, convex surfaces of the prongs and by the constant rotation of the arc of the prong about the relatively fixed pivot point. Consequently, a correspondingly greater shock or dislodging force is required to effect this tear-out as the resistance to shear of such boards is considerably greater.

The fastener remains with the studding during such shocks, as the anchor points 7, 9 tend to prevent any relative movement between the fastener and the studding. If the fastener is attempted to be forcibly removed, or if the wallboard is attempted to be forcibly displaced from the studding and the fastener remains in the wallboard, points 7, 9 merely embed themselves more deeply into the studding, securing such fastener still more steadfastly to the studding.

It is thus seen that a wallboard fastener has been provided which automatically and securely locks itself to the studding and which relies upon the reaction of the studding upon the fastener to securely lock itself with the wallboard; furthermore, this locking action occurs in such a manner that the wallboard has sufficient undisrupted material between the fastener prongs or between portions of each prong to resist relatively large shearing forces tending to dislodge the wallboard from the fastener of the above construction.

Having thus described the invention in rather full detail, it will be understood that these details need not be strictly adhered to and that various changes and modifications may suggest themselves to one skilled in the art, all falling within the scope of the invention as defined in the subjoined claims.

What I claim is:

1. A fastener for securing a wallboard to conventional studding comprising a central uniplanar base, a plurality of partially curved prongs extending angularly from opposite sides of the base, the terminal portion of each prong being arced towards the plane of the base and such arc having as a center of curvature the juncture of the respective prong with the base means to temporarily mount the fastener on the studding with each base and prong being in position to be backed by a stud, and said prongs being rotated about the center of curvature and impaling the wallboard by the reaction of the studding against the prongs when the wallboard is forced against the fastener after the fastener is temporarily secured to the studding.

2. A fastener comprising a base having a front face adapted to be disposed toward a wallboard and a rear face adapted to be disposed toward studding, a plurality of arms extending angularly from opposite edges of said base and rearwardly away from said rear face, a curved extension continuous with each arm curved back toward said rearward face and with said extensions on opposite sides being curved toward each other, and each of said curved extensions and having as a center of curvature the approximate junction of the respective arm with the base.

3. A fastener for wallboard comprising a central, uniplanar base, a plurality of curved prongs angularly extending from a pair of opposite edges of the base, the free terminals of said prongs converging to points for easier penetration into the wallboard, a free terminal portion of each prong approximating an arc of a circle whose center is the juncture of the prong and the base, and which arc relationship is maintained during partial or full engagement of each prong with the wallboard.

4. A fastener comprising a flat rectangular base, a pair of projecting arms extending from a pair of opposite edges of said base, a plurality of curved prongs extending from another pair of opposite edges of said base, said curved prongs extending from said base in the same general direction as said arms when in disengaged position relative to the wallboard, and partially extending in a general direction opposite of the arms measured from said base when in full engaged position with said wallboard.

5. The fastener of claim 4 wherein the arms converge somewhat toward each other, and further including a plurality of anchor points extending from each arm toward the opposite arm.

6. A wall construction comprising studding, wallboard, and a fastener securing the wallboard to the studding, said fastener comprising a base, a pair of projecting legs extending from said base and straddling each studding unit, a plurality of curved prongs extending from said base and oriented to the respective studding unit so as to be in partial contact therewith, said prongs being curved away from the respective studding unit, with the prongs sharply entering and securing the wallboard by the reaction of the respective studding against the prongs when the wallboard is forced against the fastener.

7. The construction of claim 6 further including projecting anchor pins extending from the legs toward the stud to anchor said fastener to the stud when said legs straddle said stud.

8. The fastener of claim 6 wherein the ends of said prongs are curved in such a manner that any small segment on said curved surface has a tangent approximately perpendicular to the rear surface of the wallboard when such segment enters the wallboard.

9. A fastener for securing a wallboard to studding comprising a base adapted to be secured to said studding, a plurality of curved prongs projecting from said base with the outer, convex side of said curved prongs being in contact with said studding, so that said wallboard, when forced against said fastener, drives said prongs into the wallboard by the reaction of the studding against the prongs, a pair of legs extending from said base for straddling each studding unit, the ends of said legs being spaced a distance slightly less than the thickness of the studding to be straddled whereby a clamping action occurs when the legs straddle said studding unit.

10. A fastener comprising a uniplanar base, a plurality of arms extending angularly from opposite ends of said base, a curved extension continuous with each arm curved back to the plane of said base and having as a center of curvature the approximate junction of the respective arm with the base.

References Cited in the file of this patent

UNITED STATES PATENTS

| | | |
|---|---|---|
| 2,066,814 | Williams | Jan. 5, 1937 |
| 2,197,750 | Lagaard | Apr. 16, 1940 |
| 2,282,624 | Upson | May 12, 1942 |
| 2,295,444 | Woodward | Sept. 8, 1942 |
| 2,325,766 | Gisondi | Aug. 3, 1943 |
| 2,527,124 | Flora | Oct. 24, 1950 |
| 2,742,778 | Olmstead | Apr. 24, 1956 |
| 2,780,850 | Lieff | Feb. 12, 1957 |